United States Patent [19]
Hoekstra

[11] Patent Number: 5,391,025
[45] Date of Patent: Feb. 21, 1995

[54] PROPELLANT GRAIN MACHINING DEVICE

[75] Inventor: Paul W. Hoekstra, Ogden, Utah

[73] Assignee: Thiokol Corporation, Ogden, Utah

[21] Appl. No.: 871,966

[22] Filed: Apr. 21, 1992

[51] Int. Cl.[6] .............................................. B23C 3/34
[52] U.S. Cl. .................... 409/137; 409/143; 409/199; 409/203; 407/31; 407/55
[58] Field of Search ................. 83/469; 409/137, 143, 409/199, 203; 407/31, 55

[56] References Cited

U.S. PATENT DOCUMENTS

| | | | |
|---|---|---|---|
| 3,464,088 | 9/1969 | Guenter | 18/12 |
| 3,630,028 | 12/1971 | Caveny | 60/234 |
| 4,085,173 | 4/1978 | Lomax, Jr. et al. | 264/3 R |
| 4,160,314 | 7/1979 | Fridy | 29/558 |
| 4,218,941 | 8/1980 | Frosch | 82/1 C |
| 4,462,286 | 7/1984 | Erhard | 82/1.4 |
| 4,541,757 | 9/1985 | Reynolds | 407/53 |
| 4,585,600 | 4/1986 | Rollyson et al. | 264/3.3 |
| 4,598,597 | 7/1986 | Widner et al. | 73/864.41 |
| 4,633,620 | 1/1987 | Lorenzi et al. | 51/165 R |
| 4,764,319 | 8/1988 | Hightower et al. | 264/3.4 |
| 4,793,866 | 12/1988 | McIntosh | 134/24 |
| 5,103,684 | 4/1992 | Denton | 73/864.41 |

Primary Examiner—Edward A. Miller
Attorney, Agent, or Firm—Madson & Metcalf; Ronald L. Lyons

[57] ABSTRACT

An apparatus for cutting a path of propellant grain away from a solid rocket motor. The apparatus includes a telescoping arm connected to a rotatable body. A cutting tool having a primary and secondary cutter is connected to a distal end of the telescoping arm. The secondary cutter is disposed adjacent the primary cutter and configured to make cuts through the portion of propellant grain along the path such that the grain is cut away from the rocket motor in a plurality of pieces. The telescoping arm includes a plurality of interconnected extendable concentric cylinders configured with a plurality of ball/spring detents each bearing a resistance load for restraining one of the concentric cylinders such that the innermost unextended of said concentric cylinders extends prior to the extension of any other of said unextended concentric cylinders.

20 Claims, 11 Drawing Sheets

PROPELLANT GRAIN MACHINING DEVICE

BACKGROUND

1. Field of the Invention

The present invention is related to a tool for machining an initial internal configuration in the solid propellant grain of a rocket motor. More particularly, the present invention is related to a device and method for machining radial slots in propellant grain by cutting a portion of propellant grain away along a path and removing the portion of propellant grain in a plurality of pieces.

2. Technical Background

When a solid rocket motor is ignited, the ignition spreads to the entire exposed surface of the inner bore of the motor within milliseconds. The motor burns from the inner bore to the case wall until all of the propellant has been ignited.

The amount of propulsion provided by the rocket motor at a given time during a burn can be generally determined by knowing the area of the surface being burned. Thus, the firing characteristics of a solid rocket motor are largely determined by the initial internal configuration of the inner bore of the motor.

For example, in a solid rocket motor having a generally cylindrical inner bore, the surface area of the inner bore will increase over the time of the burn because the diameter of the inner bore increases as the propellant is burned. Thus, the amount of propulsion provided by such a motor will generally increase over the time of the burn.

As the propellant of a solid rocket motor burns, the mass of propellant is progressively depleted. The rate at which the propellant is consumed largely determines the level of thrust generated by the motor. It has been determined that by altering the initial internal configuration of the propellant with radial, circumferential slots, some control overt the rate the propellant is consumed during the burn can be maintained.

One method of producing a rocket motor having an internal configuration with radial, conical slots is to mold the slots into the motor. In the manufacture of solid rocket motors, propellant, in liquid form, is poured into the vertically oriented rocket casing which has been fit with a casting core. The casting core is a displacement type device used to produce the desired internal configuration of the propellant.

After the propellant has cured, the core is extracted from the motor through the aft opening in the case. In instances where circumferential radial slots are cast into the propellant, the portion of the core which forms the slots must be detachable from the central portion of the core. The portion of the core forming the slot is typically made of a foam filler, which can be left in the motor for firing, or silicone rubber which must be manually removed from the motor prior to filing.

If the silicone rubber molds are utilized, extreme caution must be employed when removing the radial slot moldings to ensure that the propellant is not pinched. Because of the relative movement of the moldings and the propellant, the danger of an electrostatic buildup exists. Electrostatic discharge in the form of a spark in the presence of propellant under pressure could result in ignition of the propellant. The mere possibility of inadvertent ignition is a principal disadvantage to the use of molds to configure circumferential slots in a solid rocket motor. Additionally, high labor costs and time requirements associated with the molding of these slots render their use disadvantageous.

Another disadvantage to the use of molds to form circumferential slots in the propellant is the lack of flexibility to tailor the grain design to satisfy unique requirements of various users of solid rocket motors. Each design requires that a separate casting core be produced. Because of the complexity of the casting core, they tend to be quite expensive. Additionally, the lead time required for producing such a casting core can be as great as one year.

An additional disadvantage to molding circumferential slots in the rocket motor is the geometrical limitations on the sizes and orientation of the slots which may be molded into the propellant. Circumferential slots molded into the propellant generally must be quite shallow. If a deep slot is molded into the propellant, the mold can be virtually impossible to safely remove. Additionally, the presence of a mold extending close to the casing wall can substantially interfere with pouring the propellant into the casing.

An alternate way of configuring the interior of a solid rocket motor with circumferential radial slots is to machine the slots into the propellant by utilizing a rotatably mounted cutter. By adjusting the radial and axial location of the cutter with each rotation, the cutter slowly forms the radial, circumferential slot within the propellant by successively paring out ribbons of propellant.

A significant disadvantage to this machining process is that electrostatic buildup occurs within the motor from the relative movement of propellant ribbons across adjacent propellant surfaces. Because of the sensitive nature of the propellant grain, any significant buildup of electrostatic charge should be avoided.

Another problem associated with the use of the machining process described above is that the ribbon of propellant produced by the cutter is particularly difficult to remove. Removal of the propellant ribbon is accomplished by frequently removing the tool from the radial slot and vacuuming the ribbon from the slot and from the interior of the rocket motor. Additionally, ribbons of propellant do not lend themselves to easy removal with a vacuum hose, as they tend to adhere to the hose interior thereby plugging the vacuum system. Also, ribbons of cut propellant left within the slot interfere with the proper operation of the cutter. Thus, cutting a circumferential slot into the grain is extremely time consuming because the tool must be repeatedly removed from the motor to clear the cut propellant out of the motor.

Thus, it would be an advancement in the art to provide an apparatus and method for forming circumferential, radial slots in the propellant grain of a solid rocket motor which minimizes electrostatic buildup, thereby reducing the danger generally associated forming circumferential radial slots in propellant grain.

It would also be an advancement in the art to provide an apparatus and method for forming circumferential, radial slots in the propellant grain of a solid rocket motor which provides a method for continuously removing the propellant cut away from the rocket motor during the process.

It would be a further advancement in the art to provide such an apparatus and method which is versatile in that it could be used to tailor the grain of a general design to satisfy specific manufacturing requirements while eliminating the extreme lead time and expense of preparing new casting tooling for each design.

It would be yet another advancement in the art to provide such methods and apparatus which could machine circumferential slots in a solid rocket motor and effectively and efficiently expel the propellant removed from the rocket motor in forming the slots.

It would be an additional advancement in the art if such methods and apparatus could provide a cost-efficient means for configuring an initial internal configuration in a solid rocket motor.

Such a device and method are disclosed and claimed herein.

BRIEF SUMMARY AND OBJECTS OF THE INVENTION

The present invention is directed to a novel device for cutting and removing solid propellant from the interior of solid propellant rocket motors along specific circumferential paths. In one embodiment, the device includes a rotatable body and middle cylinder disposed within a housing. A telescoping arm is pivotally attached to the rotatable body for angular displacement with respect to the rotatable body. A novel cutting tool is attached at the distal end of the telescoping arm.

The device includes a mounting plate and attachment mechanism for securing the housing in the aft case opening of a solid rocket motor. Support and axial positioning of the housing relative to the mounting plate is provided by a clamp collar. Positive positioning of the housing to the clamp collar is provided by a plurality of machined grooves configured in the periphery of the housing which engage spring loaded detents in the clamp collar.

The rotatable body is rotated by a drive motor located on a platform above the middle cylinder and remote from the cutting tool, thereby providing for circumferential rotation of the cutting tool within the solid rocket motor. Axial positioning of the cutting tool is provided by an electromechanical mechanism in connection with the middle cylinder.

The telescoping arm includes a plurality of interconnected extendable concentric cylinders. A plurality of ball/spring detents are provided for bearing a resistance load for restraining the concentric cylinders. The load applied by the ball/spring detents on each cylinder is predetermined such that concentric cylinders extend sequentially whereby the innermost unextended of the concentric cylinders extends prior to the extension of any other of the unextended concentric cylinders.

A stepper motor is mounted on one end of the telescoping arm to drive an extension screw positioned within the center of the concentric cylinders. The extension screw includes an exterior driving sleeve, a middle floating sleeve and an interior driven rod. All three components of the extension screw are threadably connected such that as the exterior driving sleeve is rotated by the stepper motor, the interior driven rod is gradually extended. The interior driven rod is attached to the innermost concentric cylinder of the telescoping arm to which the cutting tool is attached.

In a preferred embodiment, the cutting tool has a primary and secondary cutter. The primary cutter has a circular cutting edge and includes a circular collar for directing the portion of propellant grain cut away from the motor to a disposition for removal.

The secondary cutter is located forward of the primary cutter and is disposed for rotation about an axis. The secondary cutter has a vane configuration with a plurality of cutting blade arms extending outwardly from the axis of rotation and disposed at an angle with respect to the direction of the path to be cut by the primary cutter. Thus, as the secondary cutter makes cuts in the propellant, it rotates about its axis of rotation. Each cutting blade arm has a curved cutting edge such that the secondary cutter makes rounded cuts in the propellant grain.

When the device is used for cutting propellant, the secondary cutter makes pre-cuts traversing the path to be cut in advance of the primary cutter. The primary cutter then pares away a portion of propellant along the cutting path. Importantly, the secondary cutter cuts at least as deep into the propellant as does the primary cutter. Thus, when the primary cutter pares off a portion of propellant along the path, the propellant is cut away from the motor in a plurality of pieces because of the pre-cuts made by the secondary cutter. Because the propellant is cut away from the rocket motor in a plurality of pieces, electrostatic buildup in the pieces cut away from the motor is substantially eliminated.

A vacuum hose is attached to the circular collar of the primary cutter for removing the pieces of propellant grain from within the rocket motor. Thus, the pieces of propellant grain cut away from the rocket motor are immediately removed from inside the radial slot being configured and from within the rocket motor, thereby allowing continuous propellant machining without the need for separate operations to effect propellant removal. The vacuum hose is configured with an elbow having a plurality of holes through which air may pass, thereby assisting in preventing the accumulation of pieces of propellant grain within the elbow and preventing vacuum blockage at this point.

A light and camera are also attached to the cutting tool for viewing and monitoring the activity of the cutting tool.

Thus, it is an object of the present invention to provide an apparatus and method for machining deep circumferential radial slots within the propellant grain of a solid rocket motor.

It is an additional object of the present invention to provide such an apparatus and method whereby electrostatic buildup within the rocket motor is minimized, thereby reducing the danger generally associated with preparing a solid rocket motor with such an initial internal configuration.

It is a further object of the present invention to provide such an apparatus and method for configuring an initial internal configuration in the propellant grain of a solid rocket motor which could be used to tailor the propellant grain of a general design to satisfy specific manufacturing requirements while eliminating the extreme lead time and expense of preparing a new casting tooling for each design.

It is also an object of the present invention to provide such methods and apparatus which could form an internal configuration in a solid rocket motor and effectively and efficiently expel the portions of propellant grain removed from the rocket motor.

It is yet another object of the present invention to provide a cost-efficient means for configuring an internal configuration in a solid rocket motor.

These and other objects and advantages of the present invention will become more fully apparent by examination of the following description of the preferred embodiments and the accompanying drawings.

DETAILED DESCRIPTION OF THE PREFERRED EMBODIMENTS

Figure 1:
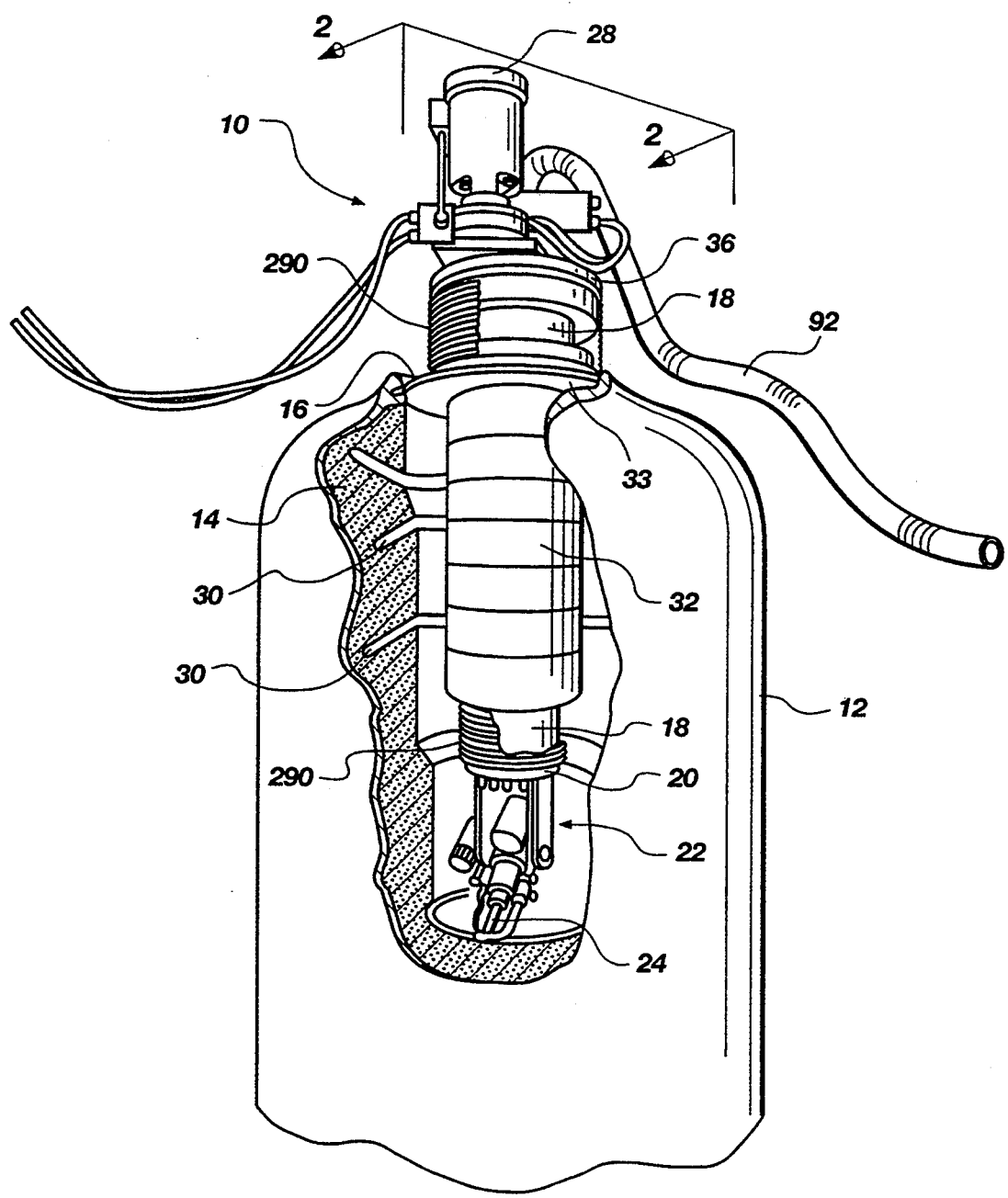
FIG. 1 is a perspective view one embodiment of the grain machining device of the present invention, as it would appear mounted on the aft end of a solid rocket motor, with portions of the solid rocket motor cut away to more particularly illustrate the grain machining device.

Reference is now made to the figures wherein like parts are referred to by like numerals throughout. With particular reference to FIG. 1, a grain machining device according to the present invention is generally designated at 10. The grain machining device 10 is shown mounted on a solid rocket motor 12, such as it would appear when being used to configure the initial internal configuration in the propellant grain 14. The device 10 is attached to the motor 12 at the aft end opening 16 where the nozzle of the motor would be located.

Figure 2:
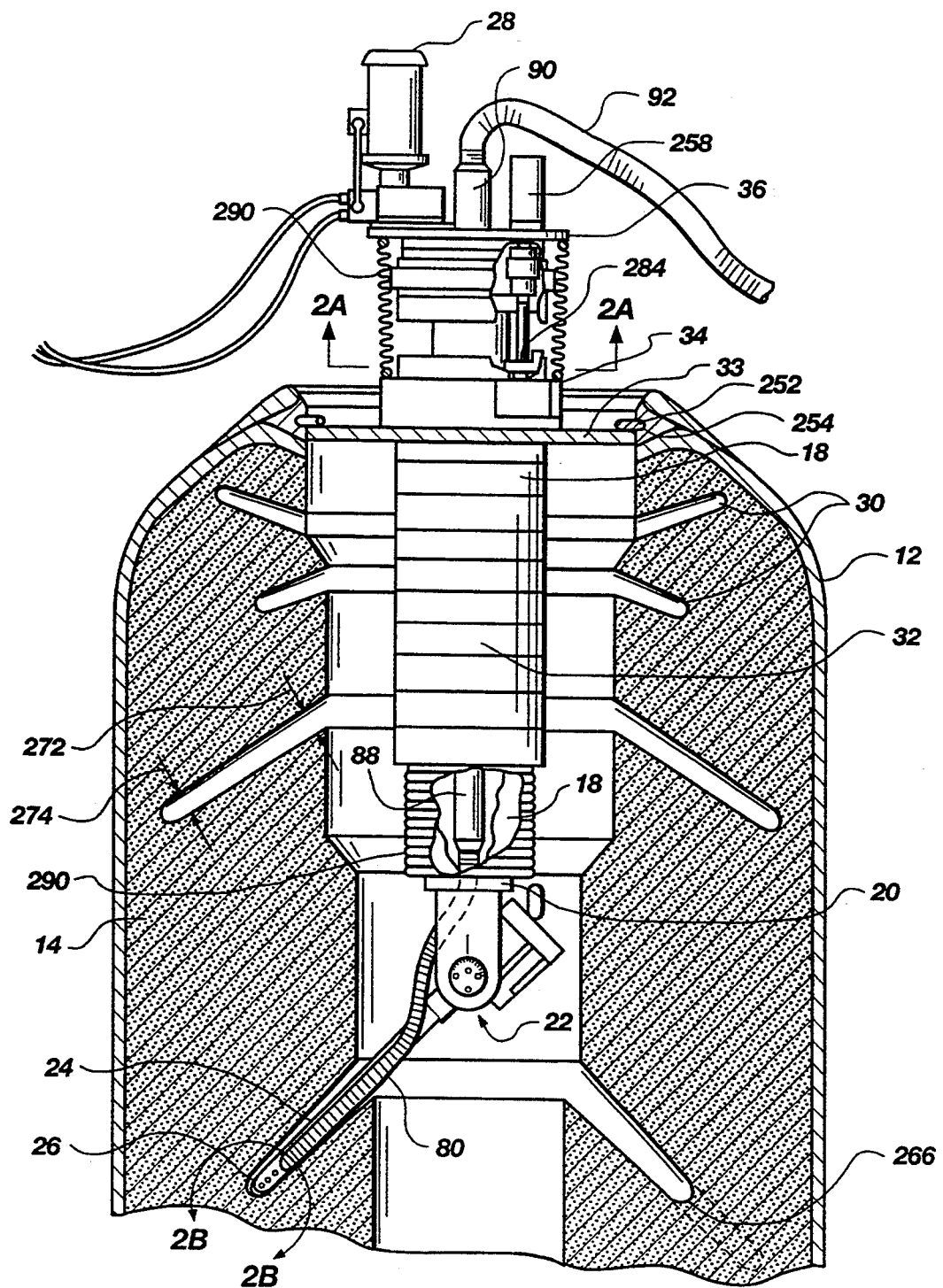
FIG. 2 is a cross-sectional view taken along line 2—2 of FIG. 1.

With reference to FIGS. 1 and 2, the grain machining device 10 includes a housing 32 which is telescopically attached to a middle cylinder 18 and a rotatable body 20. On the end of rotatable body 20 is attached the cutting apparatus 22. The cutting apparatus 22 includes a telescoping arm 24 to which is attached a cutting tool 26. An external drive motor 28 is located on a platform 36 above middle cylinder 18.

Drive motor 28 rotates the rotatable body 20 and the cutting apparatus 22 with respect to the middle cylinder 18, as is explained below in greater detail. The cutting apparatus 22 is positioned within the solid rocket motor 12 such that when it is rotated, it will cut away propellant grain along a path, thereby forming a portion of the desired internal configuration in the motor. A typical internal configuration of a solid rocket motor which is formed according to the teachings of the present invention consists of a series of circumferential, radial slots 30 formed in at least one end of the motor. Of particular importance is the ability of the present invention to provide radial, conical slots in a solid rocket motor, such as those illustrated in FIG. 2. Thus, in accordance with the teachings of the present invention, the cutting apparatus 22 may be used to cut away propellant grain from within the motor to form a variety of circumferential radial/conical slots 30.

The middle cylinder 18 is mounted for axial movement with respect to housing 32 which is rigidly attached to a mounting plate 33 by a clamp collar 34. The mounting plate 33 is affixed in the aft end opening 16 of the solid rocket motor 12.

A computer (not shown) is provided in communication with the device 10 for controlling the positioning of the cutting apparatus. The computer is preferably an NC controller, such as any of those commonly used for controlling servo motors and other electromechanical devices for remote operation. In a presently preferred embodiment, a FANUC 15T numeric controller made by General Electric Corp. is employed.

The cutting apparatus 22 is best described with reference to FIGS. 3 and 4. The cutting tool 26 includes a primary cutter 40 and a secondary cutter 42. A cutter bracket 44 is provided by which the primary cutter 40 and the secondary cutter 42 are mounted to the telescoping arm 24. The bracket 44 is configured with a shank (not shown) that fits concentrically within the end of the telescoping arm 24. The bracket 44 is secured to the arm 24 by a pin 38, as is conventionally known in the art.

In this preferred embodiment of the invention, secondary cutter 42 is mounted for rotation about an axis 46. Axis 46 includes a threaded bolt 48 which is threadably attached to a bushing 50. Secondary cutter 42 rotates about bearings 52 located between a boring 54 on secondary cutter 42 and bushing 50.

The primary cutter 40 includes a circular collar 56 and a neck 58. The leading edge of circular collar 56 is configured as a curved cutting blade 60 for paring a portion of propellant grain along a path, as indicated by arrow A. The primary cutter 40 is attached to the cutter bracket 44 by a clamp 62 and screws 64.

The curved cutting blade 60 and outside diameter of the secondary cutter 42 preferably have the same geometry and cut to the same depth. Thus, as the cutting tool 26 is moved along the path A for making cuts into propellant grain 14, both the primary cutter 40 and the secondary cutter 42 will make cuts into a portion of propellant grain 14 having substantially the same width. In those embodiments wherein the secondary cutter 42 rotates about an axis, it is preferable that the configuration of the curved cutting blade 60 of the primary cutter 40 and the outside perimeter of the secondary cutter 42 be both circular, thereby providing cuts of equal depth into the propellant grain 14 as the secondary cutter 42 rotates.

With the primary cutter 40 configured with a curved cutting blade 60, the cross section of the portion of propellant grain 14 cut away from the solid rocket motor along path A by the primary cutter 40 is generally semicurved, i.e., it has at least one curved surface, as formed by the curved cutting blade 60 of the primary cutter 40. In a presently preferred embodiment of the invention, curved cutting blade 60 is circular, thereby allowing cutting to occur along approximately 125 degrees in either direction from the distal end 61 (FIG. 3) of the cutting blade 60.

It is preferred that the depth of cut of the primary cutter 40 be limited to a maximum of approximately 0.080 inches for a primary cutter 40 having a radius of approximately one inch. For the applications described herein, such a depth of cut is generally obtained by cutting with a feed rate of no greater than approximately 0.4 inches. The feed rate is limited to ensure dynamic control over the cutting tool 26. Dynamic control is additionally dependent upon cutter speed with respect to the propellant and the rigidity of the cutting apparatus 22.

An eddy current sensor 76, such as the model 19 AC/DC powered Eddyscope made by Nortec, is attached to the exterior diameter of the cutting tool 26. The eddy current sensor 76 is included as a safety mechanism for detecting any foreign objects in the propellant grain 14. The eddy current sensor 76 is monitored by the computer so that if a foreign object is detected in the propellant 14, the drive motor 28 is automatically stopped, thereby preventing the cutting tool 26 from engaging the foreign object. Depending on the material characteristics of the foreign object, contact of the foreign object by the cutting tool 26 presents a potential for spark and propellant ignition.

Figure 3:
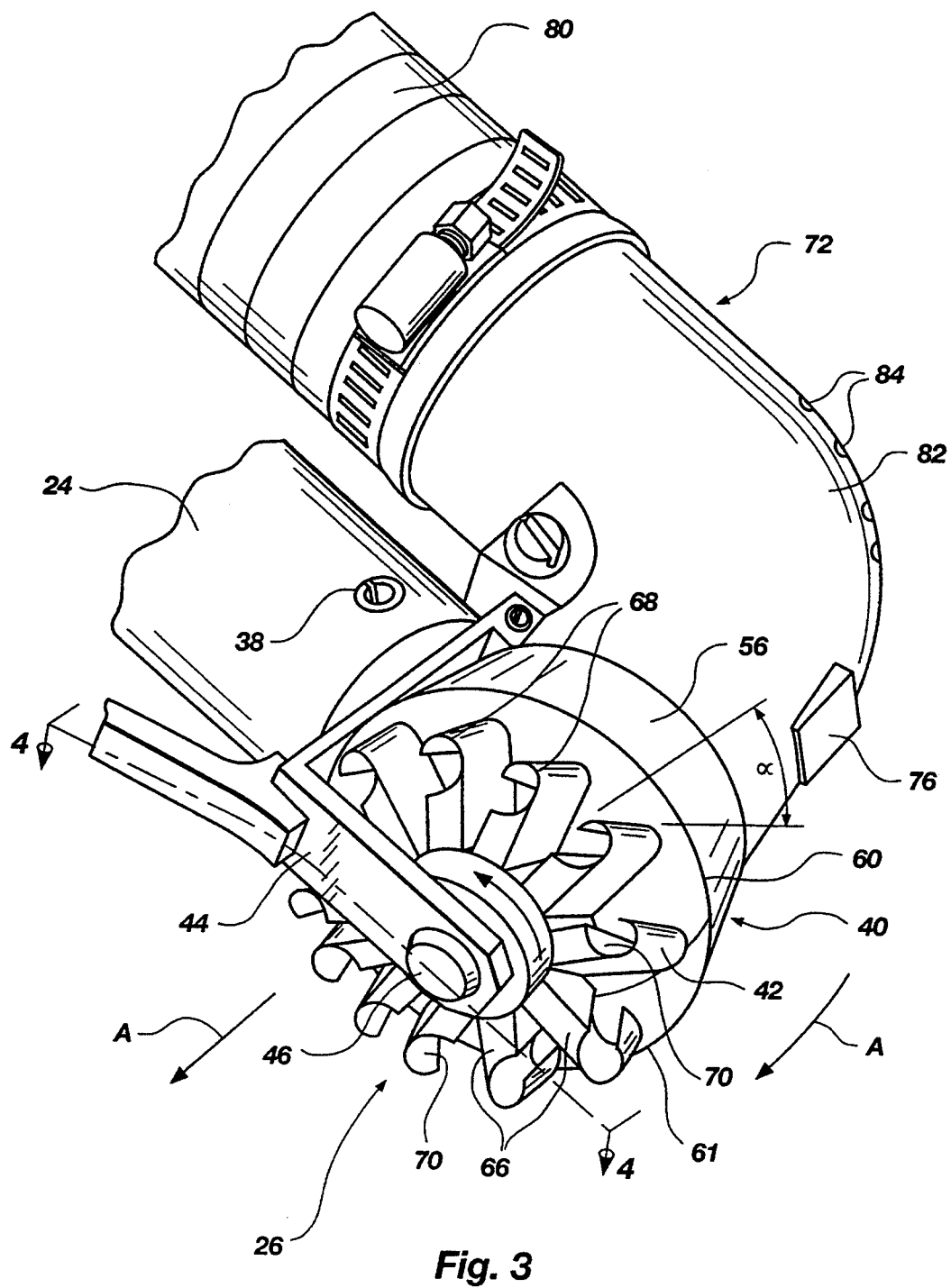
FIG. 3 is a perspective view of one embodiment of the cutting tool of the present invention.
Figure 4:
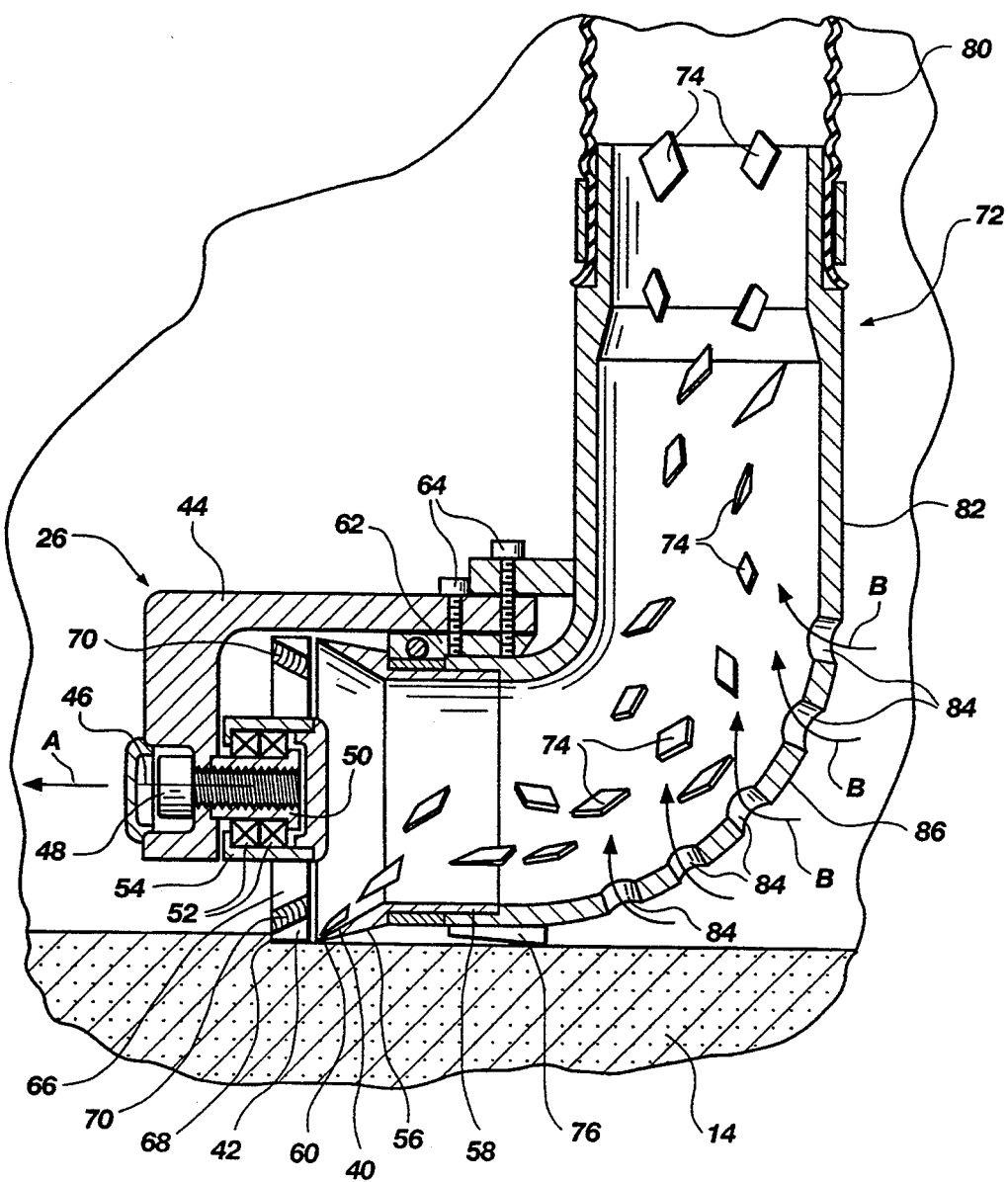
FIG. 4 is a cross-sectional view taken along line 4—4 of FIG. 3.

In this presently preferred embodiment of the invention illustrated in FIGS. 3 and 4, secondary cutter 42 has a vane configuration comprising a plurality of cutting blade arms 66 extending outwardly from axis 46. The cutting blade arms 66 are preferably disposed at an angle $\alpha$ with respect to the direction of the path. In a presently preferred embodiment of the invention, angle $\alpha$ is approximately 30 degrees.

Each cutting blade arm 66 includes a curved cutting edge 68 located on the leading, outward edge of a channel 70 configured in the cutting blade arm 66. Channel 70 is preferably configured to angle inwardly toward axis 46, as best illustrated in FIG. 4, thereby channeling the small ribbons of propellant cut by each cutting blade arm 66 into a suction member 72, as will be explained in greater detail below.

In operation, the cutting tool 26 is moved along the path A for cutting propellant grain 14. As the secondary cutter 42 comes into contact with the propellant grain 14, the curved cutting edge 68 of a cutting blade arm 66 engages the propellant 14 and begins cutting a small ribbon of propellant grain 14. Because the cutting blade arms 66 are located at an angle $\alpha$ to the path A, as the secondary cutter 42 is driven through the propellant 14, the secondary cutter 42 rotates about axis 46.

The rotation of the secondary cutter 42 combined with the forward movement of the cutting tool 26 along the path A results in each cutting blade arm 66 cutting a short ribbon of propellant in a direction generally diagonal to the path A. Consequently, the ribbon cut by each cutting blade arm 66 extends along the entire width of propellant which is subsequently cut by the primary cutter 40. As the cutting blade arm 66 continues to rotate, it eventually rotates above the surface of the propellant and the ribbon of propellant cut by than cutting blade arm 66 is separated from the propellant and is free to be removed by suction member 72.

Because the secondary cutter 42 is mounted forward of the primary cutter 40, the secondary cutter 42 makes pre-cuts traversing the path A in advance of the primary cutter 40. Hence, when the primary cutter pares off the propellant 14, rather than pare off a continuous ribbon of propellant 14, the propellant 14 is removed in a plurality of pieces, as illustrated in FIG. 4. The propellant 14 may then be easily removed by the suction member 72. Accordingly, secondary cutter 42 is configured in the cutting tool 26 such that it cuts into the propellant grain 14 at least as deep as the primary cutter 40 cuts into the propellant grain. Otherwise, the propellant 14 would not be pared off by the primary cutter 40 in a plurality of pieces 74.

As seen in FIG. 4, suction member 72 includes a suction tube 80 which is brought into communication with the cutting tool 26 via an elbow 82. Suction tube 80 extends adjacent telescoping arm 24 such that it follows telescoping arm 24 as the cutting tool 26 is moved along the path A. An external vacuum (not shown) provides suction within suction tube 80.

Elbow 82 is fit around neck 58 of the primary cutter 40 by any of those methods conventionally known in the art. The cutting apparatus 22 is thus configured such that the pieces of propellant grain 74 cut away from the rocket motor 12 by both the secondary cutter 42 and the primary cutter 40 are directed to a location within the primary cutter 40 in disposition for removal by the suction member 72. The aerodynamic drag acting on the pieces of propellant 74 convey them through tube 80 and out of the rocket motor 12.

In order to prevent any accumulation of pieces of propellant 74 in the elbow 82 which could act to clog the flow of propellant through the suction member 72, elbow 82 is preferably configured with a plurality of holes 84 at the outside corner 86 of the elbow 82. The lower pressure within the suction member 72 tends to force air through holes 84, as generally illustrated by Arrows B, thereby preventing any pieces of propellant 74 from temporarily adhering to the elbow 82 and blocking flow through the suction member 72.

Figure 5:
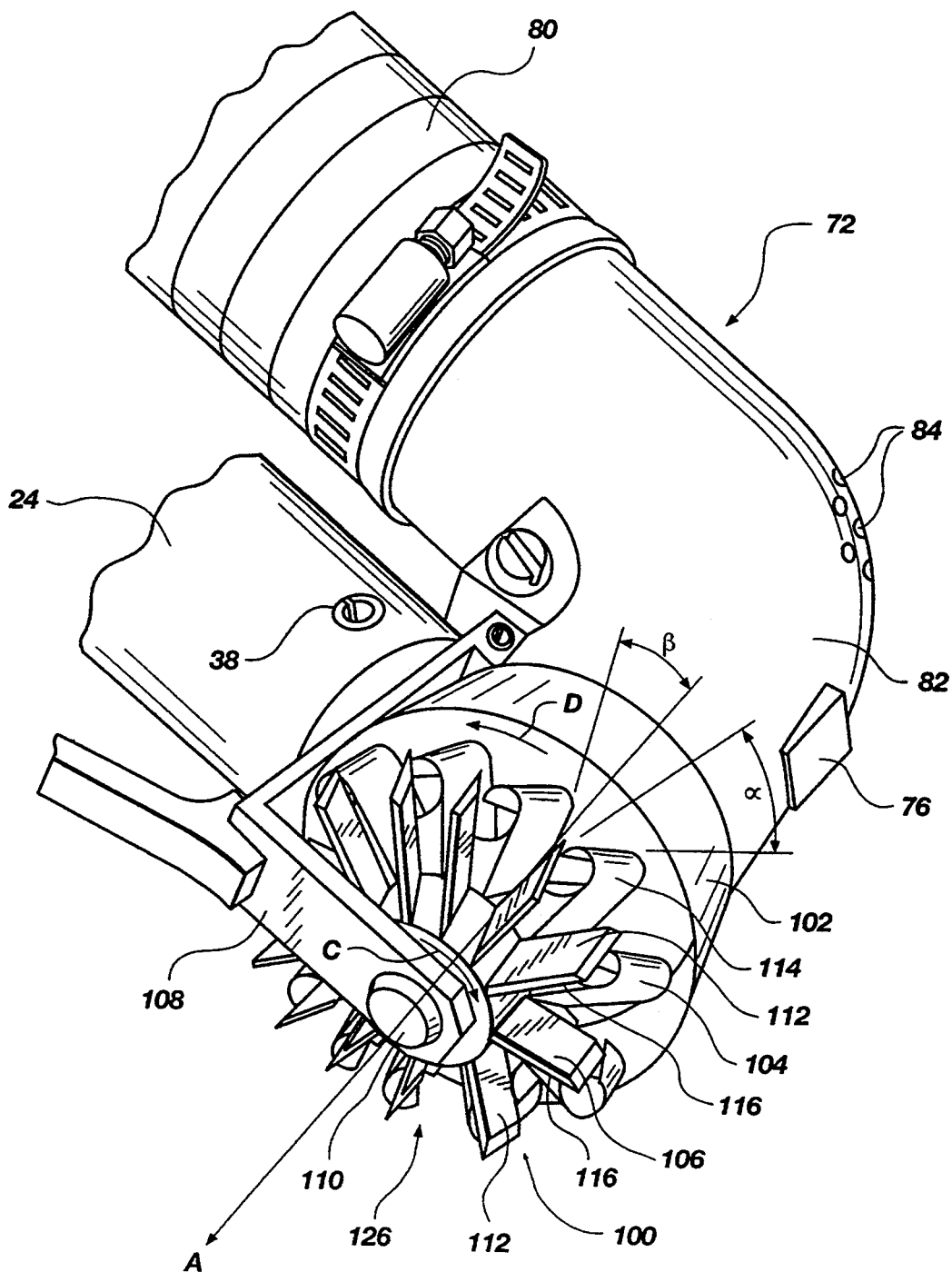
FIG. 5 is a perspective view of an alternate embodiment of the cutting tool of the present invention.

An alternative embodiment of a cutting tool is illustrated in FIG. 5 at 100. In FIG. 5, cutting tool 100 includes a primary cutter 102, a secondary cutter 104 and a supplemental cutter 106. Primary cutter 102 and secondary cutter 104 are configured substantially the same as in the embodiment illustrated in FIGS. 3 and 4.

Supplemental cutter 106 is mounted to cutter bracket 108 for rotation about axis 110. Supplemental cutter 106 has a vane configuration comprising a plurality of supplemental cutting blade arms 112 extending outwardly from axis 110. The supplemental cutting blade arms 112 are preferably disposed at an angle $\beta$ with respect to the direction of the path A. In a presently preferred embodiment of the invention, angle $\beta$ is approximately 30 degrees.

In this embodiment of the invention, the supplemental cutting blade arms 112 and the secondary cutting blade arms 114 are disposed with respect to the path A at reverse angles, i.e., angle $\alpha$ and angle $\beta$ are oriented in opposite directions from path A. The effect of configuring the secondary cutter 104 and the supplemental cutter 106 with blade arms at reverse angles is that when the cutting tool 100 is used in cutting propellant grain 14, the secondary cutter 104 rotates in the opposite direction as the supplemental cutter 106. In the embodiment illustrated in FIG. 5, the supplemental cutter 106 would rotate in a clockwise direction as illustrated by Arrow C whereas the secondary cutter 104 would rotate in a counterclockwise direction, as indicated by Arrow D.

Each supplemental cutting blade arm 112 includes a straight cutting edge 116 for cutting the propellant 14. Whether a curved or straight cutting edge is employed on the cutting blade arms 112, 114 of either the supplemental cutter 106 or the secondary cutter 104 will be determined by the propellant 14 formulation being cut by the tool.

In most circumstances, the secondary and supplemental cutters 104, 106 will cut slightly deeper into the propellant 14 than the primary cutter 102. Thus, after being cut by the cutting tool 100 of the present invention, residual cuts made by the secondary and supplemental cutters 104, 106 will extend into the propellant 14 along the cutting path to a depth equal to the amount the secondary and supplemental cutters 104, 106 extend beyond the primary cutter 102.

If the cutting blade arms 112, 114 on the supplemental or secondary cutters 106, 104 are configured with a straight cutting edge, these residual cuts in the propellant grain 14 may be the source of stress risers. Because the propellant 14 is subject to a variety of stresses, these stress risers could provide the source for cracks which could propagate through the propellant 14.

By utilizing a curved cutting edge on the cutting blade arms 112, 114 of the supplemental and secondary cutters 106, 104, the stress-rising tendencies of these residual cuts are substantially minimized. Thus, when using the cutting tool 100 for cutting most formulations of propellant grain 14, it is preferred that the cutting blade arms 112 be configured with a curved cutting edge, as is the secondary cutter 104. However, for some applications, the use of straight cutting edges on the cutting blade arms may be acceptable.

Thus, when the cutting tool 100 is used, the supplemental cutter 106 initially comes into contact with the propellant grain 14 and makes cuts into the propellant 14 as it rotates about axis 110. The cuts made by the supplemental cutter 106 are in a generally diagonal direction with respect to path A and traverse the propellant to be cut by the primary cutter 102. The secondary cutter 104, by rotating about axis 110 in the opposite direction of rotation as supplemental cutter 106 then cuts short ribbons in a generally diagonal direction but at a reverse angle to the cuts made by the supplemental cutter 106. The cuts made by the secondary cutter 104 also traverse the propellant to be cut by the primary cutter 102.

The supplemental cutter 106 and the secondary cutter 106 thus act together to cut the propellant 14 in a cross-hatched configuration such that when the primary cutter 102 pares off a portion of propellant grain along path A, the propellant is pared off in a plurality of pieces 74. As with the embodiment illustrated in FIGS. 3 and 4, the supplemental cutter 106 and the secondary cutter 104 must be configured to cut the propellant 14 at least as deep as the primary cutter 102.

The embodiment of the cutting tool 100 of FIG. 5 thus generally cuts the propellant 14 into smaller pieces than the embodiment illustrated in FIGS. 3 and 4.

Figure 6:
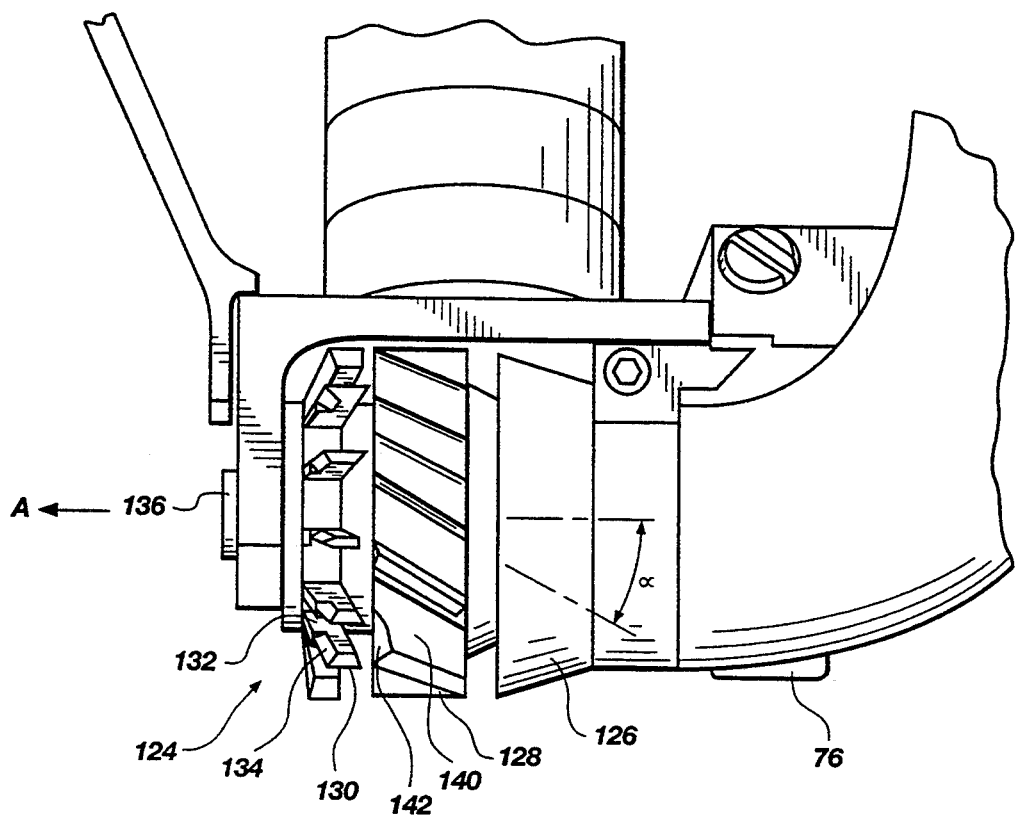
FIG. 6 is a perspective view of yet another alternate embodiment of the cutting tool of the present invention.

Yet another embodiment of a cutting tool in accordance with the teachings of the present invention is illustrated in FIG. 6. Cutting tool 124 of FIG. 6 includes a primary cutter 126, a secondary cutter 128 and a supplemental cutter 130. The primary cutter 126 and the secondary cutter 128 are mounted substantially as described with respect to the embodiment of FIG. 5.

Supplemental cutter 130 includes a plurality of supplemental cutting blade arms 132, each having a supplemental cutting edge 134. In this embodiment, the supplemental cutting blade arms 132 are mounted substantially in line with the path A along which the tool cuts. Thus, there is no need to mount the supplemental cutter 130 for rotation. However, it may be desirable to mount the supplemental cutter 130 for rotation about an axis 136, thereby enabling additional supplemental cutting blade arms 132 to be employed by the tool and thereby extending the effective life of the cutting tool 124.

The secondary cutter 128 of cutting tool 124 is configured with a plurality of secondary cutting blade arms 140 positioned at an angle α to the direction of path A, as in the previous embodiments of the cutting tool described herein. Each secondary cutting blade arm 140 is configured with a secondary cutting edge 142 located along the leading edge of the cutting blade arm 140.

When using the embodiment of the cutting tool 124 of FIG. 6, the supplemental cutter 130 initially comes into contact with the propellant grain and makes cuts into the propellant substantially in the direction of path A. The secondary cutter 128 then engages the propellant and makes diagonal cuts along the path as it rotates about axis 136. The cuts made by the secondary cutter 128 also traverse the propellant to be cut by the primary cutter 126.

The supplemental cutter 130 and the secondary cutter 128 thus act together to cut the propellant in a cross-hatched configuration such that when the primary cutter 126 pares off a portion of propellant grain along path A, the propellant is pared off in a plurality of pieces. As with the embodiments previously discussed, the supplemental cutter 130 and the secondary cutter 128 must be configured to cut the propellant at least as deep as the primary cutter 126.

While the cutting tool of the present invention is principally described herein for use in cutting propellant grain, it will be appreciated that it may be successfully employed in cutting a variety of materials, including non-propellants, and the scope of the present invention should not be limited to the cutting of solid propellant in rocket motors.

Figure 7:
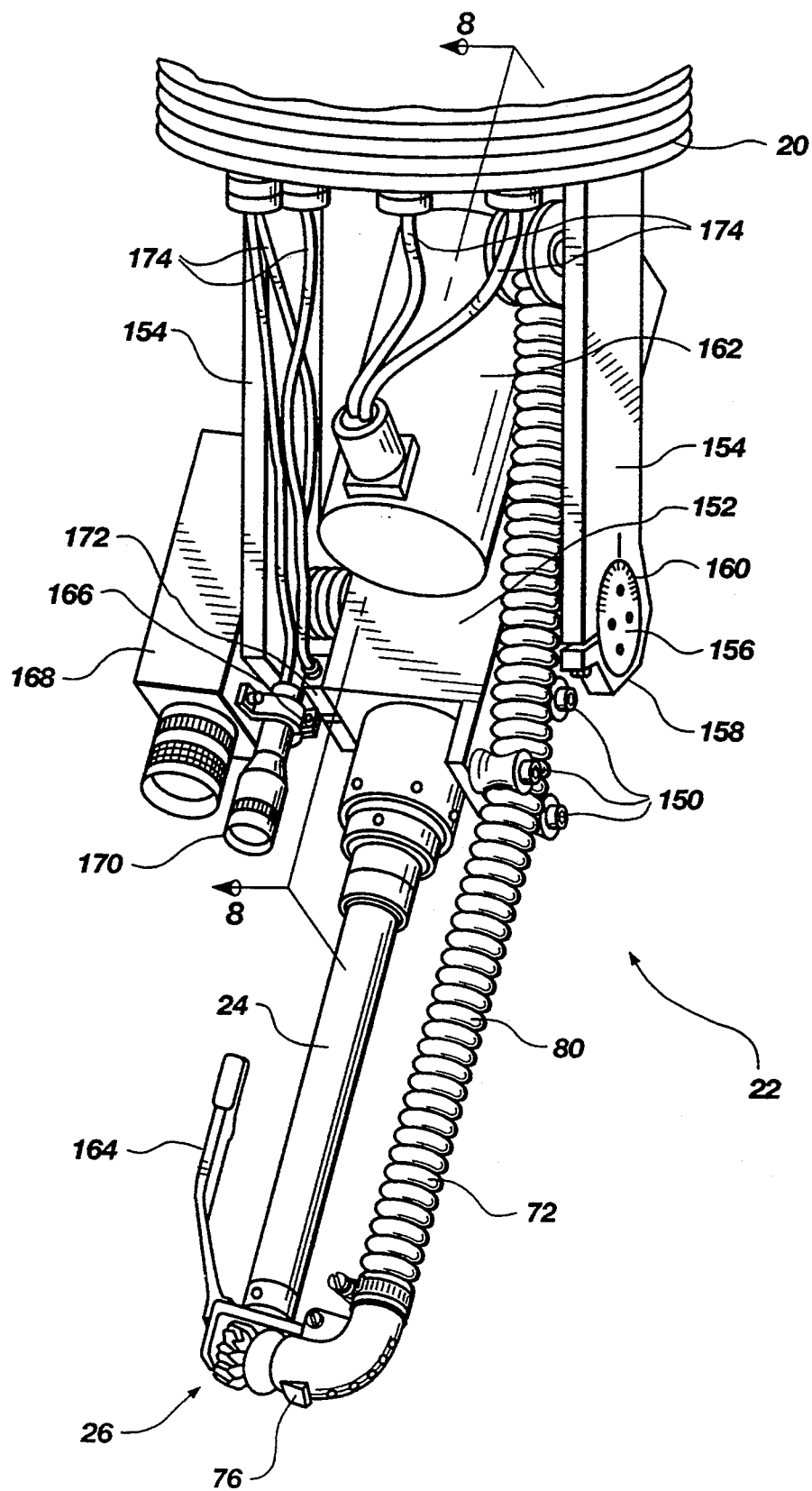
FIG. 7 is a perspective view of one embodiment of the telescoping arm and cutting tool of the present invention.

With reference now to FIG. 7, the cutting apparatus 22 includes a telescoping arm 24 to which the cutting tool 26 is attached. Suction member 72, as previously described, is mounted in communication with the cutting tool 26 to remove portions of propellant grain cut away by the cutting tool. Suction member 72 includes tube 80 which is maintained adjacent telescoping arm 24 by rollers 150.

As viewed in FIG. 2, tube 80 is attached to one end of a concentric extension tube 88 positioned inside rotatable body 20. Concentric extension tube 88 is biased in a non-extended position by conventional means and extends upon application of a force on tube 80, such as would occur as a result of the extension of middle cylinder 18 or telescoping arm 24.

Figure 2A:
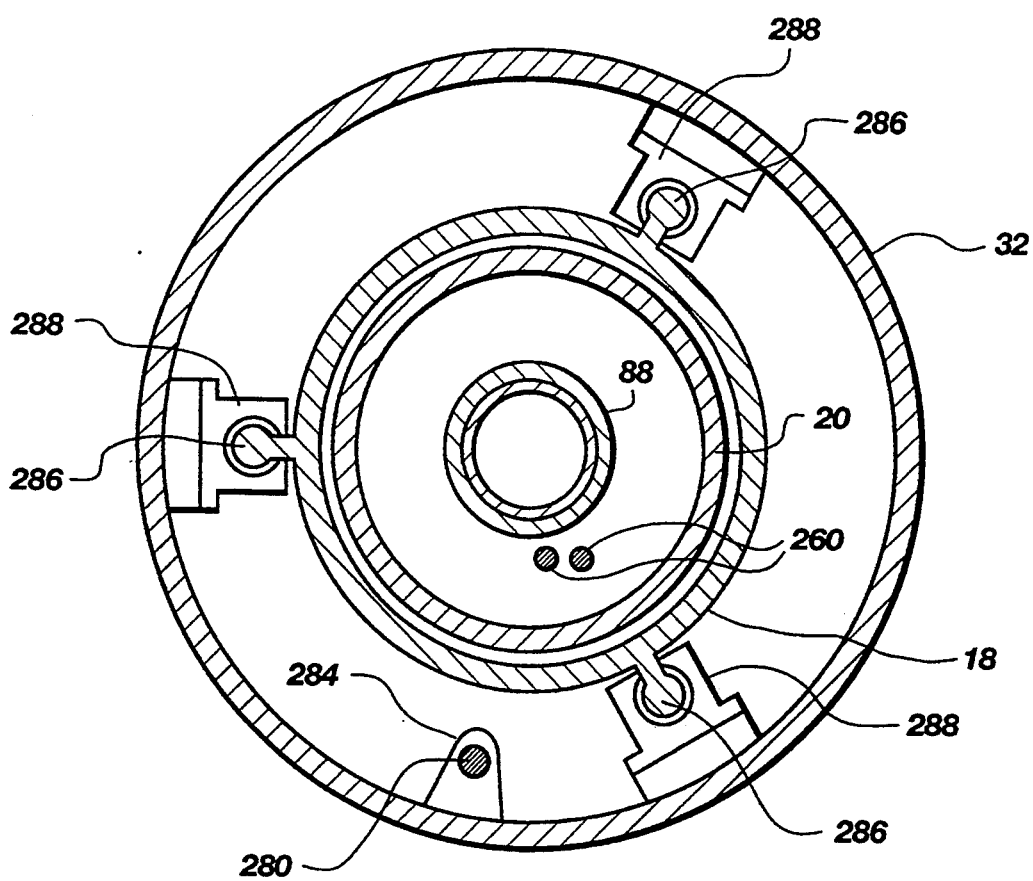
FIG. 2A is a cross-sectional view taken along line 2A—2A of FIG. 2.
Figure 2B:
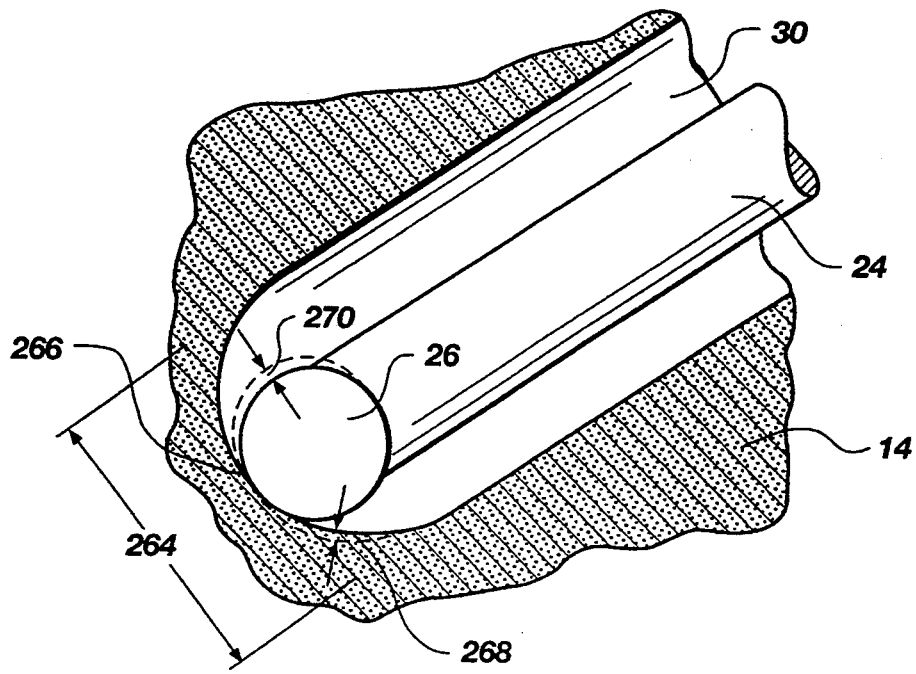
FIG. 2B is a cross-sectional view taken along line 2B—2B of FIG. 2.
Figure 2C:
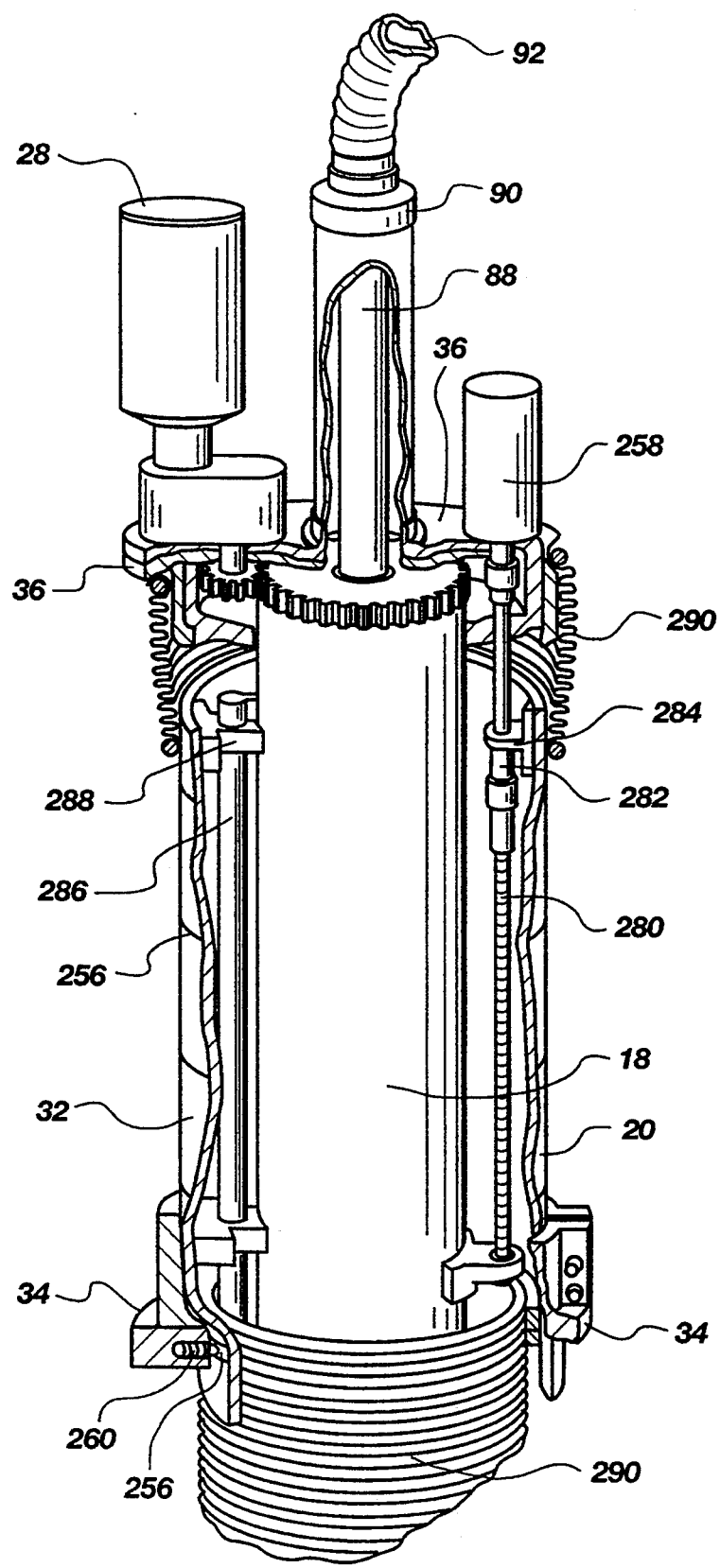
FIG. 2C is an enlarged cut-away view of the housing of the embodiment shown in FIG. 2.

As illustrated in FIG. 2C, rotation of the telescoping arm 24 and tube 80 are accommodated by a rotational slip ring assembly 90 mounted on platform 36. The slip ring assembly 90 is of that generally known in the art for accommodating such rotation and includes a vacuum line in the geometric center of the slip ring. Slip ring assembly 90 is attached to an external vacuum hose 92 which leads to the external vacuum (not shown).

Referring again to FIG. 7, the telescoping arm 24 is mounted to and extends within housing 152. Housing 152 is pivotally mounted to the rotatable body 20 by arms 154 which are attached to an axis 156 by a conventional clamp 158. Axis 156 includes an angle indicator 160 for use in adjusting the angle of disposition of telescoping arm 24.

A stepper motor 162 for driving the extension and retraction of telescoping arm 24 is attached to housing 152. In order to keep telescoping arm 24 from fully retracting and engaging the internal stops within telescoping arm 24, a limit switch 172 is mounted adjacent housing 152. The limit switch is activated by engagement with a bracket 164 attached at the end of telescoping arm 24.

When the telescoping arm 24 is retracted, bracket 164 extends into a slot 166 adjacent housing 152 where the limit switch 172 is located. The limit switch includes a light emitting diode (not shown) which emits a beam of light. As bracket 164 enters slot 166, it breaks the beam of light emitted by the light emitting diode thereby activating the limit switch 172 which shuts off stepper motor 162 to prevent further retraction of telescoping arm 24.

Also mounted to housing 152 are a camera 168 and a light 170. Camera 168 and light 170 are provided for viewing and monitoring the activity of the cutting tool 26. Wiring 174, extending interiorly of the rotatable body, transmits the image captured by camera 168 to an external monitor (not shown).

Figure 8:
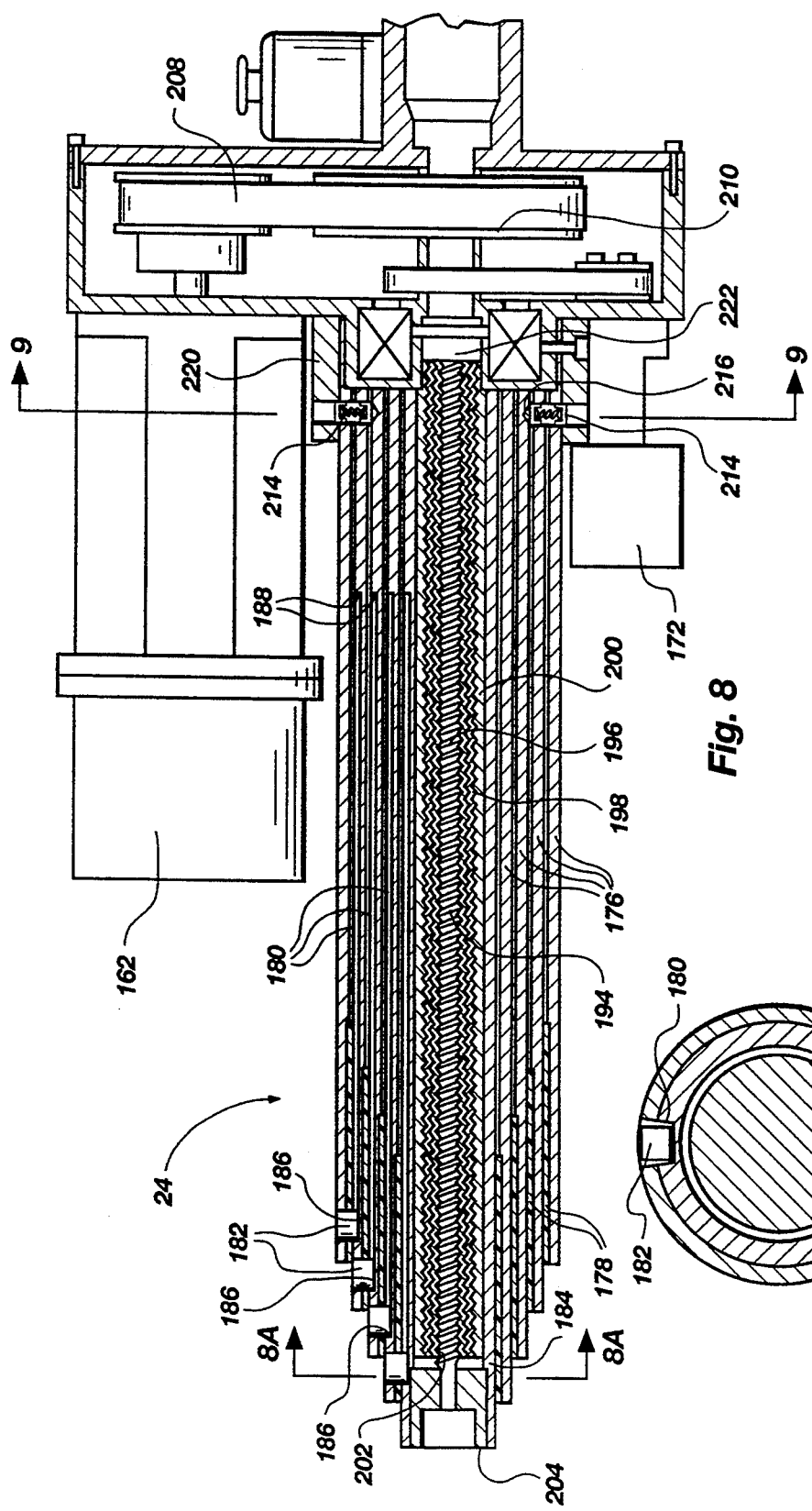
FIG. 8 is a cross-sectional view taken along line 8—8 of FIG. 7.

The components of the telescoping arm 24 are illustrated in FIG. 8. The telescoping arm 24 includes a plurality of interconnected extendable concentric cylinders 176. Between each cylinder 176 is located a bushing 178, preferably made of a self-lubricating material, which provides a surface against which the cylinders can slide against each other.

Figure 8A:
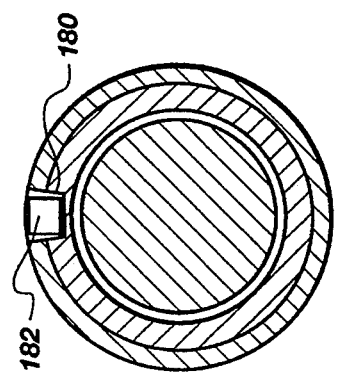
FIG. 8A is a cross-sectional view taken along line 8A—8A of FIG. 8.

As viewed in FIGS. 8 and 8A, the telescoping arm 24 is configured with a keyway 180 located between each concentric cylinder 176 for preventing the cylinders from rotating. A key 182 is attached at the end of each cylinder 176, with the exception of inner cylinder 184. Each key 182 is positioned such that it engages the keyway 180 of the adjacent cylinder 176 to the interior of the key 182. Each keyway 180 has an outside edge 186 and an inside edge 188 which serve as stops for the key 182 with which it is engaged. Hence, the relative telescoping movement of each cylinder 176 with respect to any adjacent cylinders is limited by the length of its keyway 180.

The telescoping arm 24 is extended and retracted by an extension screw 194 positioned interiorly of the inner cylinder 184. Extension screw 194 includes an interior driven rod 196, a middle floating sleeve 198 and an exterior driving sleeve 200. Interior driven rod 196 is attached at its distal end 202 to the distal end 204 of the inner cylinder 184. Interior driven rod 196 is further configured with exterior threads which engage interior threads configured on middle floating sleeve 198. Similarly, middle floating sleeve 198 is configured with exterior threads which engage interior threads on exterior driving sleeve 200.

A stepper motor 162 is provided to drive the extension screw 194. Stepper motor 162 is preferably attached with a belt 208 to a direct drive pulley 210 attached to exterior driving sleeve 200. Thus, by rotating direct drive pulley 210, exterior driving sleeve 200 is rotated, thereby causing middle floating sleeve 198 and/or interior driven rod 196 to rotate and resulting in a linear extension of interior driven rod 196 and inner cylinder 184 in an amount proportional to the amount of rotation of exterior driving sleeve 200.

An emergency stepper motor 172 is also provided for driving extension screw 194. Thus, in the event stepper motor 162 should malfunction with the telescoping arm 24 extended into a radial slot of a solid rocket motor, emergency stepper motor 172 could be employed to retract the telescoping arm and permit removal of the cutting device from the motor. As with the other stepper motors discussed herein, emergency stepper motor 172 is preferably controlled by the computer.

Wiring 174 (FIG. 7) to the stepper motor 162 and to the emergency stepper motor 172 extends through rotatable body 20 to the slip ring assembly 90 which accommodates rotation of the rotatable body 20, as illustrated in FIGS. 2 and 2A. The signal is transferred through slip ring assembly 90 which is in communication with the computer, thereby enabling the computer to control the extension of telescoping arm 24 while the cutting tool is rotating.

Telescoping arm 24 is configured such that as it extends, the concentric cylinders 176 will extend in sequential fashion with the innermost cylinder 184 extending first, i.e., the innermost unextended of the concentric cylinders 176 will extend prior to the extension of any other of the unextended concentric cylinders 176. By ensuring that the innermost unextended of the concentric cylinders 176 extends prior to the extension of any other of the unextended concentric cylinders 176, the diameter of the telescoping arm 24 near the cutting tool 26 is minimized. Minimizing the diameter of the telescoping arm 24 near the cutting tool 26 enables the height of the radial slot cut by the tool 26 to be kept at a minimum.

Figure 9:
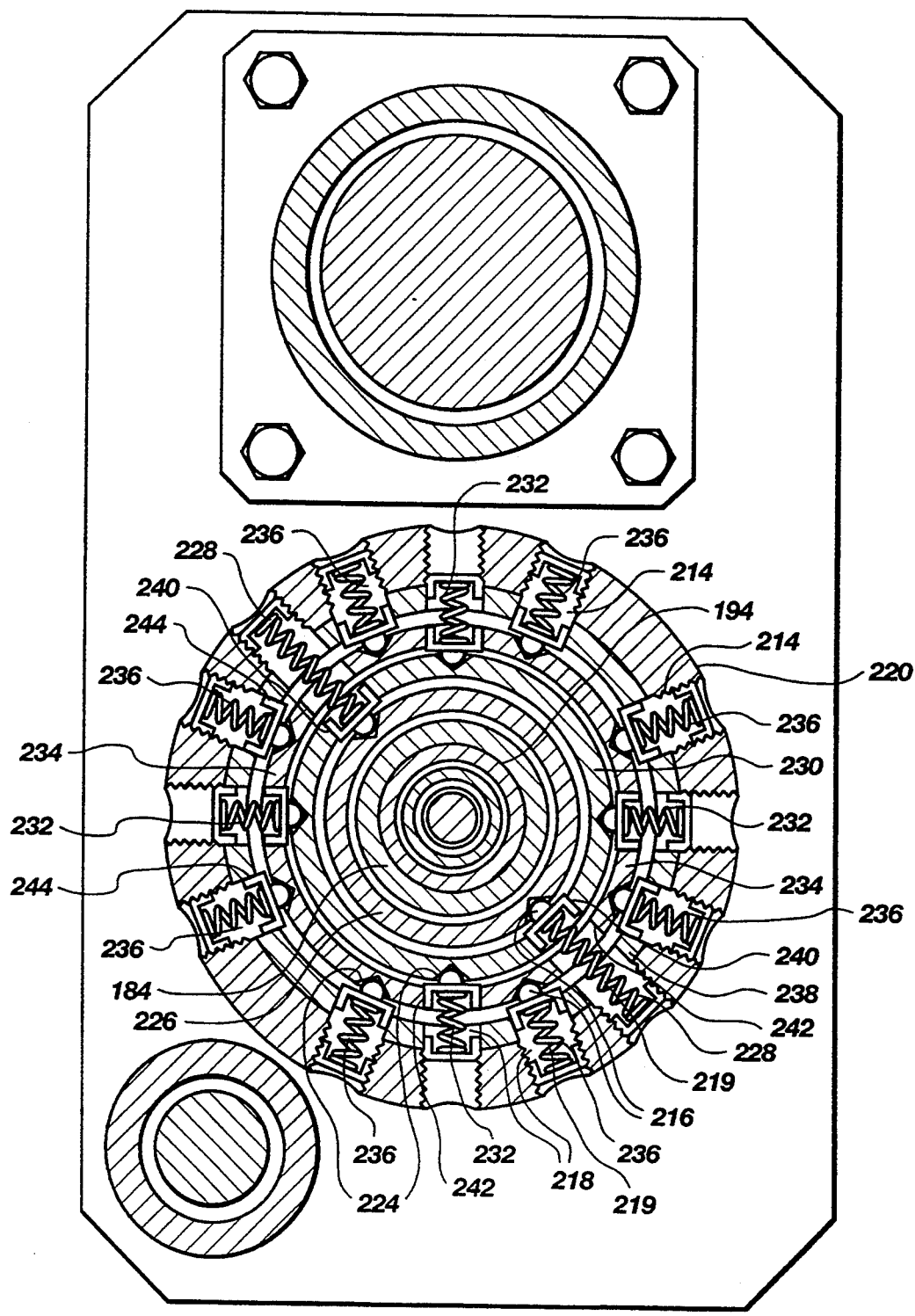
FIG. 9 is a cross-sectional view taken along line 9—9 of FIG. 8.

A plurality of ball/spring detents 214 are provided for bearing a resistance load for restraining the concentric cylinders 176 from extension. As illustrated in FIG. 9, each ball/spring detent 214 includes a ball 216 positioned within a sleeve 218. A spring 219 is located within each sleeve 218 for biasing the ball 216 towards the center of the arm 24.

As viewed in FIG. 8, the ball/spring detents 214 are mounted in a circular collar 220 extending about the proximal end 222 of the telescoping arm 24. A seat 224 is configured in the side wall of each cylinder 176 at the proximal end 222 of the arm 24 for engagement with each ball 216.

The load applied by each ball/spring detent 214 is pre-determined such that the extension of the concentric cylinders 176 is regulated in a manner such that the innermost unextended of the concentric cylinders extends prior to the extension of any other of the unextended concentric cylinders 176. Thus, the cumulative resistance force applied by ball/spring detents 214 on the innermost unextended of the concentric cylinders is always less than that applied by ball/spring detents 214 on any other unextended cylinders.

It is preferred that each cylinder surrounding inner cylinder 184 be restrained from extension by at least two ball/spring detents 214, mounted on opposing sides of the cylinder. Thus, the force applied to the restrained cylinder 176 by the ball/spring detents 214 is equal and opposite and the possibility of lateral deflection of the cylinder by the force to overcome the ball/spring detents 214 is eliminated.

In a presently preferred embodiment of the invention, second cylinder 226 is restrained by two ball/spring detents 228, third cylinder 230 is restrained by four ball/spring detents 232 and fourth cylinder 234 is restrained by eight ball/spring detents 236. (Outside cylinder 238 does not extend.) Third cylinder 230 includes notches 240 to accommodate ball/spring detents 228 restraining second cylinder 226. Likewise, fourth cylinder 234 includes notches 242 to accommodate ball/spring detents 228 and 232. And, outside cylinder 238 is configured with notches 244 at its end to accommodate all ball/spring detents 214.

In the embodiment of the invention illustrated in FIG. 9, the force applied by each ball/spring detent 214 is approximately equal. By varying the number of ball/spring detents 214 on each cylinder 176, the cumulative effect is that the total resistance on each cylinder 176 is different, depending on how many ball/spring detents 214 act on the cylinder 176. Thus, the resistance on third cylinder 230 is greater than that on second cylinder 226 and the resistance on fourth cylinder 234 is greater than that on third cylinder 230. (There is no resistance force on inner cylinder 184 from ball/spring detents.)

Consequently, as the extension screw 194 is extended, initially inner cylinder 184 will extend because it is not restrained from extension by any ball/spring detents 214. As viewed in FIG. 8, when the inside edge 188 of the keyway 180 of the inner cylinder 184 comes into contact with the key 182 of the second cylinder 226, the force tending to extend the telescoping arm 24 by extension screw 194 will overcome the restraining force applied by the two ball/spring detents 228 restraining the second cylinder 226 and permit the second cylinder 226 to extend. Upon full extension of the second cylinder 226, the force applied by the extension screw 194 will next overcome the restraining force applied by the ball/spring detents 232 on third cylinder 230, allowing it to extend. Upon full extension of the third cylinder 230, the force applied by extension screw 194 will then overcome the restraining force applied by the ball/spring detents 236 on fourth cylinder 234, thereby permitting the telescoping arm 24 to fully extend.

To machine a radial slot 30 into a solid rocket motor 12, the angle with respect to the longitudinal axis of the motor 12 at which the slot 30 is to be configured is initially determined. As illustrated in FIG. 7, the telescoping arm 24 is adjusted to that angle by loosening clamp 158, rotating the arm 24 to the desired angle with the aid of the angle indicator 160 and the clamp 158 is tightened thereby securing the telescoping arm in the desired angular orientation.

One of skill in the art will readily appreciate that the manual adjustment of the arm about axis 156 may be replaced with a stepper motor and worm gear, or any of a variety of mechanical devices generally known in the art for remotely and automatically accomplishing such an adjustment, thereby eliminating the necessity of extracting the tool assembly from the motor 12 to manually perform this adjustment. A stepper-motor adjustment is not utilized in the embodiments discussed herein to simplify the device and because the initial internal configurations machined with the present invention, i.e., conically shaped radial slots 30, can be cut into the propellant with the telescoping arm 24 maintained at a constant angle about axis 156. However, such an automatic adjustment of the tool about axis 156 could easily be accomplished and is within the intended scope of the present invention.

The device 10 is then lowered into the inner bore of the solid rocket motor 12. As illustrated in FIG. 2, mounting plate 33 fits in the aft end opening 16 of the solid rocket motor 12. Three dogs 252 are located on the mounting plate 33 for engaging the snap-ring groove 254 which is typically configured in the aft end of a solid rocket motor 12. The dogs 252 act to lock the mounting plate 33 to the motor 12 and to preload the mounting plate 33 against the motor 12 to ensure the rigidity of the attachment.

The desired initial axial positioning of the cutting apparatus 22 is then accomplished by lowering the housing 32 through the clamp collar 34 to the desired axial position. The housing 32 is then secured to the clamp collar 34 at the depth ring 256 machined on the periphery of the housing 32 which most closely corresponds to that axial position. Spring loaded detents 260 within the clamp collar 34 engage the depth ring 256 thereby ensuring positive positioning of the housing 32 relative to the clamp collar 34.

The depth rings 256 are accurately machined into the housing 32 at predetermined distances and known axial positions. In a presently preferred embodiment, the depth rings are spaced at six inch increments. Hence, by inputting into the computer which depth ring 256 is engaged by the clamp collar, the initial axial position of the cutting apparatus 22 is determined and the positioning of the cutting apparatus 22 may thereafter be controlled by the computer.

The telescoping arm 24 is then extended to the portion along the wall of the inner bore of the propellant 14 where the radial slot 30 is desired. By actuating drive motor 28, the rotatable body 20 begins rotating and the cutting tool 26 may begin cutting a radial slot into the propellant 14. The rotatable body 20 is rotated such that the cutting tool 26 is advanced in the direction of path A, as illustrated in FIG. 3.

Once cutting by the tool 26 is commenced by rotating the cutting apparatus 22 with drive motor 28, the position of the tool 26 with respect to the path to be cut is governed by two stepper motors—stepper motor 162 (FIGS. 7 and 8) which controls the extension of the telescoping arm, and a stepper motor 258 (FIG. 2), mounted on platform 36, for axially positioning the cutting apparatus. Alternatively, stepper motor 258 could be mounted within rotatable body 20. Stepper motor 162 and stepper motor 258 are each computer controlled by methods commonly known and used in the art.

With reference now to FIG. 2C, stepper motor 258 drives a threaded rod 280 which is threadably engaged by a ball screw 282. Ball screw 282 is attached to a flange 284 which is securely mounted to housing 32. Thus, as stepper motor 258 rotates the threaded rod 280, the middle cylinder 18, the rotatable body 20 and the cutting tool 26 are all forced to move in an axial, or vertical, direction with respect to the housing 32 and mounting plate 33, as can be seen upon reference to FIGS. 2 and 2C.

Bellows 290 are attached between the lower end of middle cylinder 18 and mounting plate and between the upper end of housing 32 and the platform 36, as can be seen by reference to FIGS. 2 and 2C. Bellows 290 are utilized principally to isolate the internal mechanisms of the device from ambient air which may be contaminated with particulate debris generated by the cutting operation.

As illustrated in FIG. 2C, three guide rails 286 are slidably attached between housing 32 and middle cylinder 18. Each guide rail 286 is engaged at each end by linear bearings 288 fastened to housing 32. The guide rails 286 ensure that as the middle cylinder 18 is oscillated in the axial direction, the accurate positioning of the middle cylinder 18 and rotatable body 20 with respect to housing 32 is maintained.

Stepper motor 258 only provides for limited axial movement of the middle cylinder 18 and the rotatable body 20 with respect to the housing 32, determined by the length of threaded rod 280. In a presently preferred embodiment of the invention, threaded rod 280 is sufficiently long to provide for approximately two feet of axial movement of the cutting apparatus 22.

It will be appreciated by one of skill in the art that capability for substantial axial movement without changing depth rings 256 could be provided merely by varying the length of threaded rod 280. Even as presently configured with a capacity of two feet of axial movement via threaded rod 280, it is possible to configure two axial slots in the propellant grain 14 without removing the cutting apparatus 22 from the inner bore of the rocket motor 12.

Generally, however, the initial axial positioning of the cutting apparatus 22 is accomplished by affixing the clamp collar 34 to the depth ring 256 which most closely approximates the desired depth. Further axial positioning and axial movement of the cutting apparatus 22 while cutting propellant 14 is driven by stepper motor 258 as controlled by the computer.

When cutting a radial slot 30, it is presently preferred to cut the slot 30 such that the cutting surface is maintained at the bottom 266 of the slot, as illustrated in FIGS. 2 and 2B. Thus, cuts are made across the entire height 264 of the slot prior to extending the depth of the slot at any single location.

In the presently preferred embodiment of the invention, the cutting tool 26 is controlled by the computer such that the depth of cut 268 does not exceed approximately 0.080 inches and the feed rate 270 does not exceed approximately 0.4 inches. It is presently preferred that the slot 30 be cut such that the bottom 266 of the slot is maintained with a generally semi-circular geometry. Thus, as the cutting tool 26 approaches the edge of the slot, the feed rate 270 will go to zero.

The generally semi-circular geometry is maintained in the bottom 266 of the slot 30 to ensure dynamic control over the cutter, i.e., to prevent "chatter" of the cutting tool 26 against the propellant 14. Maintaining other geometries at the bottom of the slot 30 generally require the tool 26 to cut a greater portion of propellant 14 at the edges of the slot 30. The amount of propellant 14 that may be removed in a single cut while preserving dynamic control over the cutter 26 is also dependent upon the cutter speed with respect to the propellant 14 and the rigidity of the cutting apparatus 22. Thus, while the described method is preferred, other methods may be successfully employed while maintaining dynamic control over the cutter 26.

Thus, the position of the cutting tool 26 is continuously adjusted in the axial direction by stepper motor 258 (FIG. 2) and in the radial direction by the telescoping arm 24 as driven by stepper motor 162 (FIG. 7) to maintain a generally constant feed rate and ensure that depth-of-cut limitations are not exceeded. By continuously rotating the cutting tool 26, the depth of the slot 30 is gradually increased until it has the desired depth.

When cutting radial slots 30 in propellant grain, it is generally preferred that slot be slightly tapered such that the proximal end 272 of the slot has a height greater than the distal end 274. The taper of the slot facilitates the cutter cutting deep slots. Indeed, one of the principal advantages of the present invention is the ability to configure circumferential, conical slots into propellant which extend virtually to the casing wall of the rocket motor.

It will be appreciated by one of skill in the art that although stepper motor 162, stepper motor 172 (FIG. 8) and stepper motor 258 (FIG. 2) are specified herein to be stepper motors, servo motors may be substituted therefor with substantially equivalent performance. When working with explosive compositions such as those machined by the present invention, any motor employed in close proximity to the propellant should be brushless thereby minimizing any risk of spark or electrostatic buildup which could cause possible ignition of the propellant under appropriate circumstances. It has been found that both stepper motors and servo motors may be successfully employed in applications involving highly sensitive explosive compositions.

As can be realized from the foregoing, the present invention provides an apparatus and method for configuring an initial internal configuration in the propellant grain of a solid rocket motor which reduces electrostatic buildup, thereby reducing the danger generally associated with machining propellant grain. Additionally, the present invention allows the controlled machining of propellant grain while avoiding pinch points with the portion of propellant grain removed from the rocket motor. By providing for the efficient and effective expulsion of portions of propellant grain which are cut away from the motor, the present invention may operate effectively continuously to machine the propellant without the necessity of repeatedly removing the device from the rocket motor to clear away propellant being cut away.

Importantly, the present invention provides means for configuring a variety of configurations into the propellant grain of solid rocket motors, thereby enabling a variety of designs to be produced and tested without the substantial lead time required of other methods. Thus, the present invention provides a cost-effective means of configuring an initial internal configuration in a solid rocket motor.

It should be appreciated that the apparatus and methods of the present invention are capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A tool for cutting away a portion of propellant grain along a path, comprising:
    a bracket;
    a primary cutter attached to said bracket, said primary cutter including a cutting blade configured for cutting away the portion of propellant grain along the path; and
    a secondary cutter attached to said bracket, said secondary cutter including at least one cutting blade arm positioned to make cuts through the portion of propellant grain along the path and configured to make cuts in the propellant grain at an angle to the cuts made in the propellant grain by said primary cutter, such that the portion of propellant grain is cut away in a plurality of pieces.

2. A tool as defined in claim 1, wherein said primary cutter has a curved cutting blade such that the portion of propellant grain cut away along the path by said primary cutter has a cross section that is generally semi-curved.

3. A tool as defined in claim 2, wherein said primary cutter further comprises a circular collar for directing the portion of propellant grain cut away to a disposition for removal.

4. A tool as defined in claim 1, wherein said secondary cutter cuts into the propellant grain at least as deep as said primary cutter cuts into the propellant grain.

5. A tool as defined in claim 4, wherein said secondary cutter further includes a hub which is rotatably mounted to said bracket, said hub defining an axis of rotation.

6. A tool as defined in claim 5, wherein said secondary cutter has a vane configuration comprising a plurality of cutting blade arms extending outwardly from said axis.

7. A tool as defined in claim 6, wherein said cutting blade arms are disposed at an angle with respect to the direction of the path such that said secondary cutter rotates about said axis as said secondary cutter makes cuts through the portion of propellant grain along the path.

8. A tool as defined in claim 6, wherein each of said cutting blade arms comprises a curved cutting edge such that said secondary cutter makes rounded cuts in the propellant grain.

9. A tool as defined in claim 4, wherein said secondary cutter is disposed forward of said primary cutter and said secondary cutter makes pre-cuts traversing the path in advance of the primary cutter cutting away the portion of propellant grain along the path.

10. A tool as defined in claim 4, further comprising a supplemental cutter attached to said bracket, said supplemental cutter including at least one cutting blade arm configured to make cuts in the propellant grain at an angle to the cuts made in the propellant grain by said primary cutter and said secondary cutter.

11. A tool as defined in claim 10, wherein said supplemental cutter cuts into the propellant grain at least as deep as said primary cutter cuts into the propellant grain.

12. A tool as defined in claim 11, wherein at least one of said secondary cutter and said supplemental cutter is mounted to said bracket for rotation about an axis of rotation.

13. A tool as defined in claim 12, wherein at least one of said secondary cutter and said supplemental cutter has a vane configuration comprising a plurality of cutting blade arms extending outwardly from said axis.

14. A tool as defined in claim 12, wherein said secondary cutter is mounted to said bracket for rotation about an axis of rotation and has a vane configuration comprising a plurality of cutting blade arms extending outwardly from said axis, said cutting blade arms being disposed at an angle with respect to the direction of the path such that said secondary cutter rotates about said axis as said secondary cutter makes cuts through the portion of propellant grain along the path.

15. A tool as defined in claim 12, wherein said supplemental cutter is mounted to said bracket for rotation about an axis of rotation and has a vane configuration comprising a plurality of cutting blade arms extending outwardly from said axis, said cutting blade arms being disposed at an angle with respect to the direction of the path such that said supplemental cutter rotates about said axis as said supplemental cutter makes cuts through the portion of propellant grain along the path.

16. A tool as defined in claim 12, wherein said secondary cutter and said supplemental cutter are each mounted to said bracket for rotation about an axis of rotation and each has a vane configuration comprising a plurality of cutting blade arms extending outwardly from said axis, said cutting blade arms of said secondary cutter being disposed at an angle with respect to the direction of the path such that said secondary cutter rotates about said axis as said secondary cutter makes cuts through the portion of propellant grain along the path, said cutting blade arms of said supplemental cutter being disposed at a reverse angle with respect to the direction of the path such that said supplemental cutter rotates about said axis in a direction opposite to said secondary cutter as said supplemental cutter makes cuts through the portion of propellant grain along the path.

17. A tool as defined in claim 4, wherein said secondary cutter is disposed forward of said primary cutter and said secondary cutter makes pre-cuts traversing the path in advance of the primary cutter cutting away the portion of propellant grain.

18. A tool as defined in claim 11, wherein said supplemental cutter is disposed forward of said primary cutter and said supplemental cutter makes pre-cuts traversing the path in advance of the primary cutter cutting away the portion of propellant grain along the path.

19. A tool as defined in claim 1, further comprising a suction member in communication with said primary cutter through which the plurality of pieces of propellant grain may be removed from within the propellant grain being cut.

20. A tool as defined in claim 19, wherein said suction member comprises an elbow configured with a plurality of holes through which air may pass thereby assisting in preventing the accumulation of pieces of propellant grain within said suction member.

* * * * *